United States Patent [19]

Tamutus

[11] 4,129,628
[45] Dec. 12, 1978

[54] METHOD OF MAKING A THERMOPLASTIC LENS BY VACUUM FORMING

[75] Inventor: Donald J. Tamutus, Trenton, N.J.

[73] Assignee: RCA Corporation, New York, N.Y.

[21] Appl. No.: 706,449

[22] Filed: Jul. 19, 1976

[51] Int. Cl.² .............................................. B29D 11/00
[52] U.S. Cl. ...................................... 264/1; 264/268; 264/511; 350/167
[58] Field of Search ..................... 264/1, 297, 92, 268, 264/220; 425/808; 350/167

[56] References Cited

U.S. PATENT DOCUMENTS

| 2,067,843 | 1/1937 | Tonnies | 350/167 |
| 3,475,521 | 10/1969 | Stroop | 351/160 |
| 3,538,198 | 11/1970 | De Montebello | 350/167 |
| 3,724,673 | 4/1973 | Ryon | 264/92 |

FOREIGN PATENT DOCUMENTS 45-16594  5/1966  Japan ......................................... 264/1

*Primary Examiner*—James B. Lowe
*Attorney, Agent, or Firm*—H. Christoffersen; Samuel Cohen; William Squire

[57] ABSTRACT

A method of making an array of lenses includes the steps of softening a sheet of optically transparent thermoplastic material, such as a clear acrylic resin and vacuum forming the softened sheet into an array of lens shells. The shells are then filled with a clear cast acrylic-polyester resin having an index of refraction closely matching that of the sheet. A thin film of polyester material is placed over the plane surface of the cast resin and a sheet of glass is placed over the film. The resin is cured in an oxygen-inhibited atmosphere at room temperature and the glass and film are then removed, forming a planar surface on one side of each of the lenses, the other surface being convex and being formed by the acrylic resin sheet.

6 Claims, 5 Drawing Figures

METHOD OF MAKING A THERMOPLASTIC LENS BY VACUUM FORMING

BACKGROUND OF THE INVENTION

1. Field of the Invention

The present invention relates to forming plano-convex lenses.

2. Description of the Prior Art

Prior art apparatus and method of making lenses include the forming of optical lenses by pressure forming the lens in a mold between pressure plates. That is, male and female dies are impressed against a plastic sheet to form the lens or lenses in the sheet. Such lenses require the forming of both a male and female die member. Other means for making curved optical surfaces include placing a heated sheet of Plexiglas over a master mold and then allowing the sheet to cool. Still other methods include adding a solution of polymerized butyl methacrylate and monomeric butyl methacrylate in a mold having a curvature corresponding to the desired lens. The solution hardens and becomes integral with the lens, forming the optical surface thereof. This form of lens includes a method of making plastic contact lenses wherein the surfaces thereof are formed under pressure. All of these processes are relatively complex and expensive, requiring either accurate dies or pressure-forming devices or additional materials to actually form the lens surface.

SUMMARY OF THE INVENTION

A method of making a lens comprises fomring a plus convex lens having a minus concave cavity in a sheet of optically transparent material. The cavity is filled with an optically transparent medium which is formed into a planar lens surface opposite the surface of the plus convex lens forming a plano-convex lens. A feature of the invention includes a method of making an array of interconnected plano-convex lenses by forming an optically transparent thermoplastic sheet into a plurality of adjacent hollow concave cavities each having a convex portion oppositely disposed the surface forming the concave cavity and filling the concave cavities with an optically transparent medium having substantially the same index of refraction as the material and forming a planar surface for each of the lenses opposite the convex surfaces. A further feature of the invention is vacuum forming the sheet into the desired convex lens shape.

DESCRIPTION OF THE PREFERRED EMBODIMENT

Figure 1:
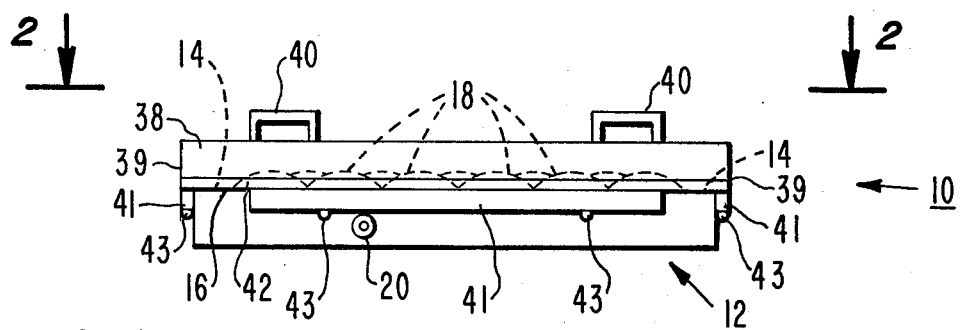
FIG. 1 is an end elevational view of an apparatus constructed and operated in accordance with an embodiment of the present invention.
Figure 2:
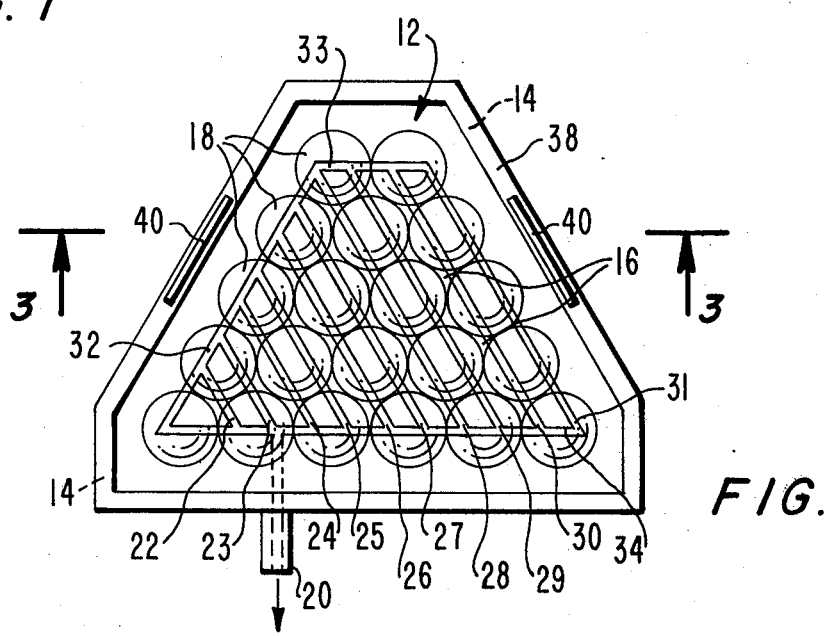
FIG. 2 is a plan view of the apparatus of FIG. 1 taken along lines 2—2.

In FIG. 1, apparatus 10, used in forming plano-convex thermoplastic lenses, includes a base 12 formed of any suitable material such as aluminum. Base 12 is a frustro-triangular shaped plate, FIG. 2, having a perimeter surface 14 disposed on upper surface 16. Cemented to and secured firmly to the upper surface 16 of base 12 are a plurality of conventional commercial glass plano-convex lenses 18. These lenses conform to the desired optical characteristics for a given implementation. The lenses are disposed coplanar with each other on surface 16 contiguous at the rims thereof in the manner shown in FIG. 2 forming an array of 20 lenses disposed within perimeter surface 14. The lenses are secured with the planar surfaces contiguous with surface 16. Lenses 18 are identical. Formed in the base 12 is a vacuum line 20. Line 20 is connected to a plurality of channels 22–34 formed in base 12 surface 16. Channel 34 runs transverse vacuum line 20 and in communication therewith. Channels 22–31 communicate with channel 34 at one end thereof and channels 32 and 33 at the other end as shown in FIG. 2. The channels 21–31 are parallel to each other and coplanar with channels 32–34. Lenses 18 cover portions of each of the channels 22–34. Portions of the channels are exposed to the air space between the various lenses 18. When a suitable vacuum is applied to line 20, ambient air is sucked through the exposed portions of the various channels 22–34 into line 20.

Aluminum frame 38 corresponds to and sits upon the perimeter surface 14. Frame 38 includes a pair of handles 40 to aid in the manipulation thereof. Frame 38 overlaps perimeter surface 14 throughout as illustrated at 39. A thermoplastic sheet fastening rod 41 and screws 43 are secured to the underside of the overhanging edges of frame 38. Rods 41 and screws 43 secure a thermoplastic sheet 42 to frame 38. Sheet 42 is formed by apparatus 10 into a plurality of lenses as will be explained.

In operation a smooth cast thermoplastic sheet 42, such as an acrylic resin sheet (e.g., methyl methacrylate manufactured by Rohm & Haas under the trademark Plexiglas) is heated in an oven (not shown) to a temperature at which the material becomes soft and pliable. This temperature has a range between 290°–360° F. for acrylic material. This temperature usually lies substantially above the heat distortion point of the thermoplastic sheet. Other types of smooth cast plastic sheets can also be used such as polyester formed by the condensation reaction between ethylene glycol and terephthalic acid (manufactured under the trademark Mylar by the duPont Corporation) and polyvinyl chloride sheets. The smoothness of the thermoplastic sheet 42 is important to the present invention and it is preferred that the sheet be made by being cast against glass. Plastic sheeting formed in this manner has a glass-smooth surface. Cast sheeting employed in the present invention may have a thickness of any suitable value, but in the preferred form is approximately 0.060 inches thick.

Figure 3A:
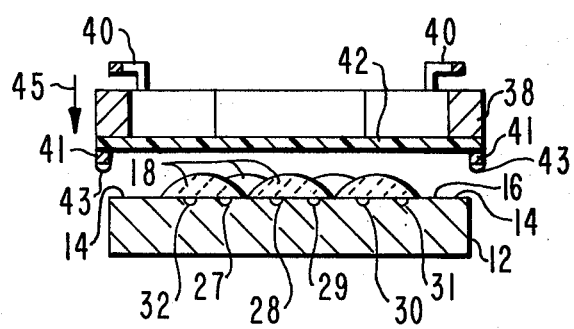
FIGS. 3a and 3b are end sectional views of the apparatus of FIG. 2 taken along lines 3—3, during different phases of the operation of the apparatus of FIG. 1.
Figure 3B:
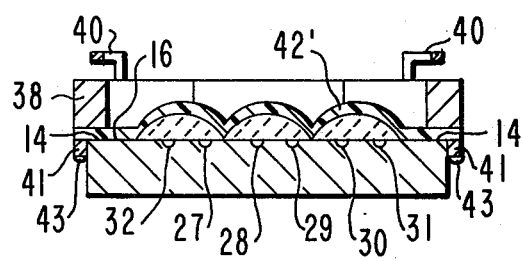

The glass-smooth sheet 42 is heated to its forming temperature while fastened to the frame 38 by rods 41 and screws 43. When so heated and softened, frame 38 is manipulated via the handles 40 over the base 12 and contiguous with perimeter surface 14, FIG. 3a, direction 45. Meanwhile, a vacuum is being applied to vacuum line 20. Vacuum line 20 via channels 22–34 evacuates the air space between base 12, surface 16, lenses 18 and the softened sheet 42 once frame 38 abuts perimeter surface 14 forming an air tight seal therewith. Atmospheric air pressure then forces softened sheet 42' against the lenses 18, FIG. 3b. The formed sheet 42° is then allowed to cool with the vacuum applied. Conventional acrylics, that is methyl methacrylate, usually cool and harden in a matter of a few minutes. Formed sheet 42' of FIG. 3b has an exterior convex surface which is glass-smooth and forms an almost perfect exterior lens surface. Slight imperfections, air bubbles, etc. may form at the interface of sheet 42' and lenses 18. These are optically removed as will be explained. The deformed sheet 42' is then removed from the jig of FIG. 3b by lifting frame 38 from base 12.

Figure 4:
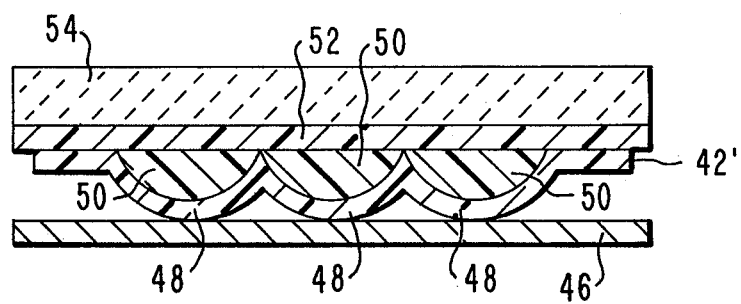
FIG. 4 is an end sectional view of an apparatus showing an additional phase in the making of a lens according to an embodiment of the present invention.

In FIG. 4, sheet 42' is inverted and is secured to a level planar support 46. In the alternative, a support molded and shaped complementary to sheet 42' may be provided to secure sheet 42'. The concave cavities of each of the formed lenses 48 in sheet 42' is filled with a liquid acrylic polyester resin 50 optically clear and light stable, marketed by the Castolite Company under the tradename of Castolite A.P. The acrylic polyester resin 50 has an index of refraction closely matching the index of refraction of the acrylic sheet 42'. For example, the index of refraction of sheet 42' is 1.49 and the acrylic polyester resin 50 is approximately 1.5. The reason for the matching of the index of refractions is that the resin 50 fills the bubbles and voids on the inner surface 51 of each of the formed sheet 42' lenses resulting from imperfections during the forming of sheet 42'. Once the resin 50 cures, the imperfections at the interface with sheet 42' optically vanish and each lens 48 appears as an optically pure integral material.

The resin 50 cures at room temperature and in the absence of oxygen. This material cures with a mild exotherm reaction. That is, it gives off slight heat as the material cures. Since the resin 50 is an oxygen inhibited curing medium, a thin film 52 of Mylar, a trademark of the duPont Corporation, is placed over the liquid resin 50. Mylar film 52 may have a thickness of 3-5 mils. The cavities of lenses 48 are first over filled with resin 50 so that resin 50 completely wets the upper surface of sheet 42'. Then Mylar film 52 is unrolled onto the resin at one corner of sheet 42, squeezing the resin as it rolls over sheet 42' removing all air. A sheet of glass 54 is placed on top of the Mylar film 52 to provide a rigid planar form for the surface of the resin 50 adjacent film 52. Excess resin 50 is thus squeezed from beneath the film 52. The surface of film 52 is glass-smooth providing a glass-smooth finish to the resin 50 when the resin 50 hardens and cures. After the hardening and curing of the resin 50 (24 hours), the glass 54 is removed and the Mylar film 52 is peeled away from the resin 50, leaving a glass-smooth almost optically perfect surface forming a planar surface of the lenses 48. The sheet 42' is then removed from the support 46, thus forming together with the hardened material 50 an array of optically transparent lenses 48 formed by the sheet 42' and the resin 50.

The array of lenses may then be used, for example, in one implementation, as solar light collectors for concentrating solar radiant energy onto respective corresponding ones of conventional photoelectric cells (not shown). The cells then may be interconnected to form a power source for converting solar radiant energy into electrical energy. While a triangular array of 20 lenses is illustrated, this is shown for purpose of illustration rather than by way of limitation. As a result, a rather inexpensive and simple method is shown and described for making an array of plano-convex lenses having relatively accurate optical characteristics and yet made of relatively inexpensive thermoplastic material.

The following example of the method and means for forming plano-convex lenses will now be set forth. This example is illustrative and is not to be construed as limiting in any way.

EXAMPLE

Base 12 is formed of aluminum having three legs each having a length of about 28 inches with an approximate 5 inch plateau between the intersection of two intersecting legs. Frame 38 overlaps base 12 about ½ inch. Vacuum line 20 has an internal diameter of about ¼ inch while channels 22-34 each have a traversing width about 3/16 inches. Each of the lenses 18 are identical, having a planar surface on one side and a convex lens surface on the other side. The edges of each of the lenses are contiguous. The lenses 18 each have a diameter of 4½ inches and a twelve inch focal length. The channels 22-34 are in communication with the surface 16 of the base 12 between the lenses 18. A vacuum of about 28 inches of mercury is applied to line 20.

A sheet of acrylic Plexiglas (methyl methacrylate) 0.060 inches thick is secured to the underside of frame 38 by rods 41 and screws 43 fastened to frame 38 through suitable holes in the perimeter of the sheet. The sheet of acrylic is cell cast by pouring a polymer between two sheets of plate glass. The sheet has an index of refraction of 1.49. The surfaces thereof are glass-smooth, optically clear, and light transparent. The frame and Plexiglas sheet is then placed in an oven and heated to 290° (2½ minutes). At this temperature the sheet is soft and pliable. The sheet and frame are then removed from the oven and placed over the base 12 contiguous with lenses 18. The vacuum in the channels at the edges of each of the lenses 18 immediately pulls sheet 42 contiguous against lenses 18 deforming the sheet 42 into the shape of lenses 18. Deformed sheet 42' is maintained with the vacuum in the "on" condition for several minutes at room temperature during the cooling of sheet 42'. After cooling to room temperature, frame 38 is removed from base 12 and the sheet 42' unfastened from frame 38. The sheet 42' is then reversed in orientation as shown in FIG. 4. Each of the cavities formed by the lenses 48 in the sheet 42' are over-filled by approximately ⅛ inch with acrylic polyester resin as manufactured by the Castolite Company. The Castolite resin 50 is made by mixing 10 drops of hardener (methyl ethyl ketone peroxide made by the Castolite Company) to 1 ounce of casting resin, polyester-acrylic. The mix is stirred until thoroughly mixed. The mixture is then degassed by placing the mixture in a low vacuum, 8 lbs. of vacuum, to allow all air mixed into the mixture to escape to the ambient. A film of Mylar 3 mils thick is placed on top of the liquid resin and rolled across all of the cavities of the lenses 48. All air between the film and the resin is rolled out. A plate glass is placed on top of the Mylar film and the ⅛ inch resin over-fill squeezed out. The resin is allowed to cure for a period of 24 hours until completely hardened. The Mylar film and glass plate are then removed. Sheet 42' and resin 50 form a continuous integral array of interconnected lenses 48. The lenses are of excellent quality for concentrating solar radiant energy onto photoelectric cells and the master mold can be reused without appreciable deterioration of quality of lenses.

During hardening, shrinkage may cause the plane surface of the lenses to be slightly concave. Where absolutely plane surfaces are required, one solution is to polish this surface flat. This can be achieved by cutting about 0.010 inches of material on a lathe or until flat and then polishing with a plastic polishing compound such as Lustrux P.G., tradename of the Tizen Chemical Corporation, or other suitable plastic polishing compound. In the alternative, a second solution is one where the slightly concave cavity can be filled with the liquid plastic resin as described above. The shrinkage in this case is negligible.

What is claimed is:

1. A method of making an array of plano-convex lenses comprising the steps of:

placing an array of plano-convex lenses, in the array pattern desired, on a flat surface flat side down;

placing a sheet of thermoplastic material, heated to its softening point over the exposed convex surfaces of the lenses;

creating a vacuum beneath the sheet to thereby cause the sheet to adhere to and assume the shape of the array of lenses, the outer surface of the sheet thereby assuming the final shape desired for the array of lenses;

permitting the sheet to harden;

after the sheet has hardened, removing it from the array of lenses and placing the hardened sheet on a support, convex surfaces down;

filling the concave cavities in the hardened sheet with an optically transparent fluid medium of the type which hardens, upon curing, and which has an index of refraction, when hard, which is substantially equal to that of the sheet; and curing said medium to thereby harden the same, the surface of said medium, when hard, being adapted to form the plane surface of said array of lenses, and the outer surface of the sheet forming the convex surfaces of the array of lenses.

2. The method of claim 1 wherein said filling step comprises forming said plane surface for each of said lenses coplanar.

3. The method of claim 1 wherein said medium comprises an optically clear thermoplastic.

4. A method of making an array of plano-convex lenses comprising:

softening a sheet of optically transparent material, placing said softened sheet over the convex surfaces of a plurality of convex lenses arranged in a coplanar array, applying a vacuum to the inner surface of said softened sheet, that is, the surface adjacent to said lenses to thereby cause said sheet to assume the shape of said coplanar array, said inner surface of said sheet forming a plurality of concave cavities corresponding in shape to the convex surfaces of said lenses, and the outer surface of said sheet forming the convex surfaces of the final array of lenses, hardening said deformed sheet, filling said concave cavities in said hardened sheet with a fluid of the type which hardens when it cures and which is an optically transparent medium when it is hard, hardening said fluid, and forming a planar surface on the optically transparent medium in each concave cavity opposite the convex outer surface of the sheet forming the cavity.

5. The method of claim 4, wherein said planar surface is formed by placing over the fluid, before it has hardended, a sheet of thermoplastic material and removing the sheet, after the fluid has hardened.

6. A method of forming a thermoplastic lens comprising:

vacuum forming a heated optically clear cast sheet of thermoplastic over the surface of a preformed lens whose optical characteristics it is desired to duplicate such that the outer surface of said sheet assumes the shape of the preformed lens surface, and the inner surface of the sheet tends to assume the shape of the lens surface but which may include imperfections, hardening the sheet and after it is hard removing it from the preformed lens, filling the cavity including said imperfections thereby formed in the sheet with a fluid medium which hardens when it cures and which, when hard, has an index of refraction substantially equal to that of the sheet; and leaving the sheet in place over the hardened medium, the outer surface of the sheet forming the desired lens surface, and the imperfections at the inner surface of the sheet being made optically clear by the hardened medium thereby forming an integral optically clear lens.

* * * * *